(12) United States Patent
John et al.

(10) Patent No.: US 12,540,593 B2
(45) Date of Patent: Feb. 3, 2026

(54) FUEL INJECTOR ASSEMBLY HAVING SLEEVE WITH FLOW-DIRECTING CAP AND ENGINE SYSTEM USING SAME

(71) Applicant: Caterpillar Inc., Peoria, IL (US)

(72) Inventors: Bobby John, Peoria, IL (US);
Jonathan W. Anders, Peoria, IL (US);
Naga Krishna Chaitanya Kavuri, Melissa, TX (US); Dean C. Diers, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 18/602,500

(22) Filed: Mar. 12, 2024

(65) Prior Publication Data
US 2025/0290480 A1 Sep. 18, 2025

(51) Int. Cl.
*F02M 61/14* (2006.01)
*F02M 21/02* (2006.01)

(52) U.S. Cl.
CPC ........ *F02M 61/14* (2013.01); *F02M 21/0206* (2013.01); *F02M 21/0275* (2013.01)

(58) Field of Classification Search
CPC . F02M 61/14; F02M 21/0206; F02M 21/0275
See application file for complete search history.

(56) References Cited

U.S. PATENT DOCUMENTS

| | | | |
|---|---|---|---|
| 9,920,714 B2 | 3/2018 | Ginter et al. | |
| 10,072,606 B2 | 9/2018 | Brunner | |
| 11,326,569 B2 | 5/2022 | Perr | |
| 11,713,735 B2 | 8/2023 | Browne et al. | |
| 2012/0217323 A1* | 8/2012 | Martinsson | F02M 61/166 72/342.2 |
| 2017/0363054 A1* | 12/2017 | Pickard | F02F 1/242 |
| 2023/0374955 A1* | 11/2023 | Schumacher | F02M 21/0266 |

FOREIGN PATENT DOCUMENTS

| | | |
|---|---|---|
| JP | 3752818 B2 | 3/2006 |
| WO | 200884502 A1 | 7/2008 |
| WO | 2015127943 A1 | 9/2015 |

* cited by examiner

*Primary Examiner* — Xiao En Mo
(74) *Attorney, Agent, or Firm* — Brannon Sowers & Cracraft

(57) ABSTRACT

An engine system includes an engine housing having an intake port to convey an incoming flow of intake air to a first intake valve opening and a second intake valve opening located downstream of the first intake valve opening. A port fuel injector assembly is supported in the engine housing and includes a fuel injector within a sleeve and an outwardly opening fuel injection valve. The sleeve includes a fuel-directing cap extending into the intake port and forming a fuel injection opening defining an outgoing fuel path axis oriented at a fuel exit angle, to improve distribution of a gaseous fuel such as a gaseous hydrogen fuel to the respective intake valve openings for mixing and combustion in an engine cylinder. Related apparatus of a port fuel injector assembly and methodology is also disclosed.

20 Claims, 2 Drawing Sheets

FUEL INJECTOR ASSEMBLY HAVING SLEEVE WITH FLOW-DIRECTING CAP AND ENGINE SYSTEM USING SAME

TECHNICAL FIELD

The present disclosure relates generally to port fuel injection in an engine system, and more particularly to a sleeve in a port fuel injector assembly having a fuel-directing cap with a fuel injection opening.

BACKGROUND

Internal combustion engines are well-known and widely used throughout the world for diverse purposes ranging from electric power generation to operation of pumps, compressors, and other industrial equipment. Combustion of traditional liquid hydrocarbon fuels tends to generate various exhaust emissions, some of which are undesired in various circumstances. In recent years, research and development efforts have increasingly focused on transitioning engine platforms away from operation on traditional liquid fuels such as diesel, gasoline, and others to gaseous fuels such as natural gas and various so-called "alterative" fuels including gaseous molecular hydrogen.

While operating engines on hydrogen shows theoretical promise, such endeavors are not without shortcomings and potential obstacles. Certain gaseous fuels, including gaseous molecular hydrogen, may have a very rapid flame speed during combustion in an engine, necessitating various modifications to traditional engine apparatus and control strategies. It has also been observed that thorough mixing of the fuel with air prior to initiating combustion can bring about various desirable combustion properties including controllability, predictability, and generally avoidance of undesired forms of combustion. One known example engine platform that can be operated on gaseous fuels including apparently hydrogen is set forth in U.S. Pat. No. 9,920,714 B2 to Ginter et al.

SUMMARY

In one aspect, an engine system includes an engine housing having an intake port structured to convey an incoming flow of intake air from an upstream intake air feed opening to a first intake valve opening and a second intake valve opening located downstream of the first intake valve opening. The engine system further includes a port fuel injector assembly including a sleeve supported in the engine housing, and a fuel injector within the sleeve and having a fuel injection valve movable between a closed position, and an open position to inject a fuel into the intake port. The sleeve defines a sleeve axis and includes a fuel-directing cap extending into the intake port and forming a fuel injection opening defining an outgoing fuel path axis extending in opposition to the incoming flow of intake air.

In another aspect, a fuel injector assembly includes a sleeve defining a sleeve axis and including a fuel-directing cap forming a fuel injection opening defining an outgoing fuel path axis oriented at a fuel exit angle relative to the sleeve axis. The fuel injector assembly further includes a fuel injector within the sleeve and having an outwardly opening fuel injection valve movable along the sleeve axis between a closed position, and an open position to inject a fuel from the fuel injection opening.

In still another aspect, a method of operating an engine system includes opening a fuel injection valve of a port fuel injector supported in a sleeve in an engine housing, and injecting a gaseous fuel admitted via the opening of the fuel injection valve through a fuel injection opening in the sleeve into an intake port in an engine housing. The method further includes advancing the injected gaseous fuel from the fuel injection opening in opposition to a flow of a stream of incoming intake air, and distributing the injected gaseous fuel to a first intake valve opening and a second intake valve opening for combustion in a cylinder in the engine housing.

DETAILED DESCRIPTION

Figure 1:
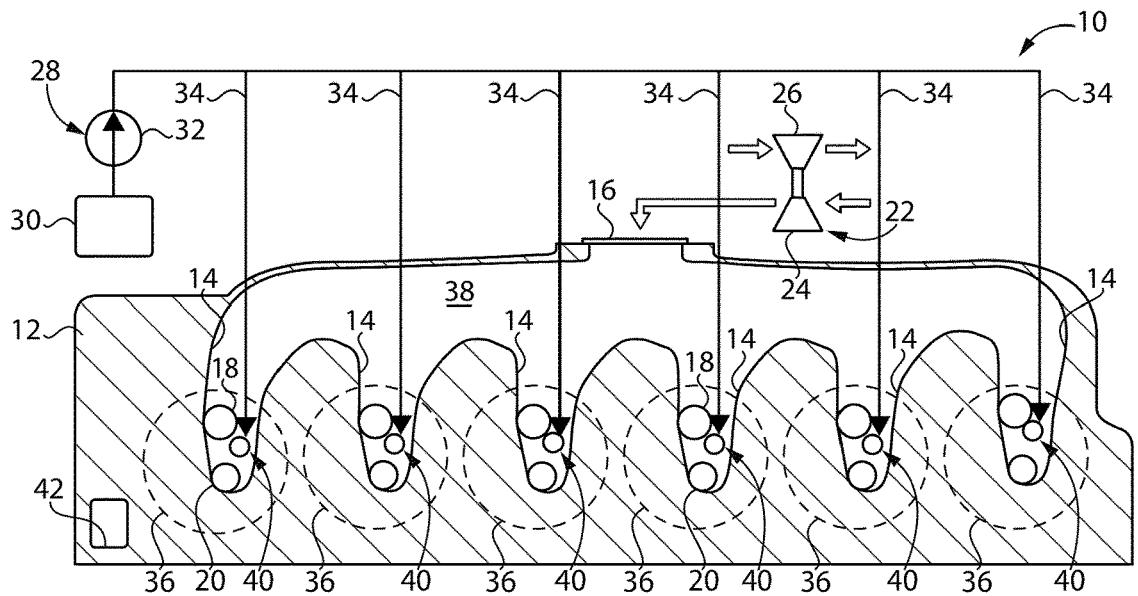
FIG. 1 is a sectioned top view of an engine system, according to one embodiment.

Referring to FIG. 1, there is shown an internal combustion engine system 10 according to one embodiment. Engine system 10 includes an engine housing 12 including therein a plurality of intake ports 14 and a plurality of port fuel injector assemblies 40. Each intake port 14 is structured to convey an incoming flow of intake air from an upstream intake air feed opening 16 to a first intake valve opening 18 and a second intake valve opening 20 from each respective intake port 14 to a combustion cylinder 36 formed in engine housing 12. Second intake valve opening 20 is located downstream of first intake valve opening 18, the significance of which will be further apparent from the following description. Description and discussion herein of any part of engine system 10 in the singular, such as intake port 14, first intake valve opening 18, second intake valve opening 20, etc., should be understood to refer by way of analogy to any other like part in engine system 10.

In the illustrated embodiment, engine housing 12 includes an integrated cylinder head configuration where each of the plurality of intake ports 14 is fed from a common plenum or cavity 38 fluidly connected to intake air feed opening 16 in one monolithic or slab engine housing part. Combustion cylinders 36 may be formed in a cylinder block of engine housing 12 generally positioned behind engine housing 12 in the FIG. 1 illustration. Also in the illustrated embodiment, engine system 10 includes six combustion cylinders 36 in an inline arrangement. Other embodiments could include any number of combustion cylinders in any suitable arrangement including, for example, combustion cylinders in a V-pattern in a cylinder block attached to two integrated cylinder heads or to a plurality of unit cylinder head sections corresponding in number to a number of combustion cylinders, for example. One or more coolant cavities 42 are also formed in engine housing 12 to convey a liquid coolant through and around various parts of engine system 10 to dissipate heat. It will also be appreciated that exhaust ports and exhaust valves movable to open and close exhaust valve openings to the exhaust ports will be included in engine system 10, as well as ignition triggering devices such as sparkplugs, fuel-fed prechamber ignition devices, or even liquid fuel injectors in a dual fuel application.

Engine system 10 further includes a fuel system 28 having a fuel supply or tank 30 containing a suitable fuel, and one or more fuel pumps 32. Suitable fuels according to the present disclosure may include, but are not necessarily limited to, gaseous fuels such as natural gas, methane, ethane, or a gaseous hydrogen fuel such as gaseous molecular hydrogen, including blends of these gaseous fuels and/or still others in any combination. A plurality of fuel feed conduits 34 are structured to feed gaseous fuel to the plurality of port fuel injector assemblies 40. Each port fuel injector assembly 40 is structured to inject gaseous fuel into a corresponding one of intake ports 14. It has been discovered that operating an engine on certain fuels, including gaseous hydrogen fuels, tends to be performed most optimally where the injected fuel is robustly mixed with pressurized intake air such that the mixture available for combustion in each respective combustion cylinder is relatively thoroughly blended by the timing of ignition, such as a timing of producing an electrical spark.

It has also been observed that in certain engine arrangements, sub-optimal mixing of gaseous fuel and air can occur at least in part because of poor distribution of port-injected gaseous fuel to multiple intake valve openings. It will be readily apparent to those skilled in the art that the pressurized intake air from intake air feed opening 16 will tend to rush rapidly to the respective intake valve openings 18 and 20. Depending upon placement of a port fuel injector, relatively more and relatively less gaseous fuel, respectively, may be admitted into a combustion cylinder through two intake valve openings. The relatively poor distribution is believed to be due at least in part to flow patterns of the incoming intake air carrying port-injected gaseous fuel preferentially to only one intake valve opening, commonly the intake valve opening that is relatively more downstream than the other. As a result, within the cylinders the gaseous fuel may be relatively poorly mixed with air and/or biased in distribution to only certain parts of the cylinder, with some parts of the cylinder being relatively fuel-rich and other parts being relatively fuel-lean. When ignition is triggered, such as by spark-ignition, the poor distribution and/or poor mixing of gaseous fuel and air can result in undesired combustion phenomena, at least absent mitigation.

Figure 2:
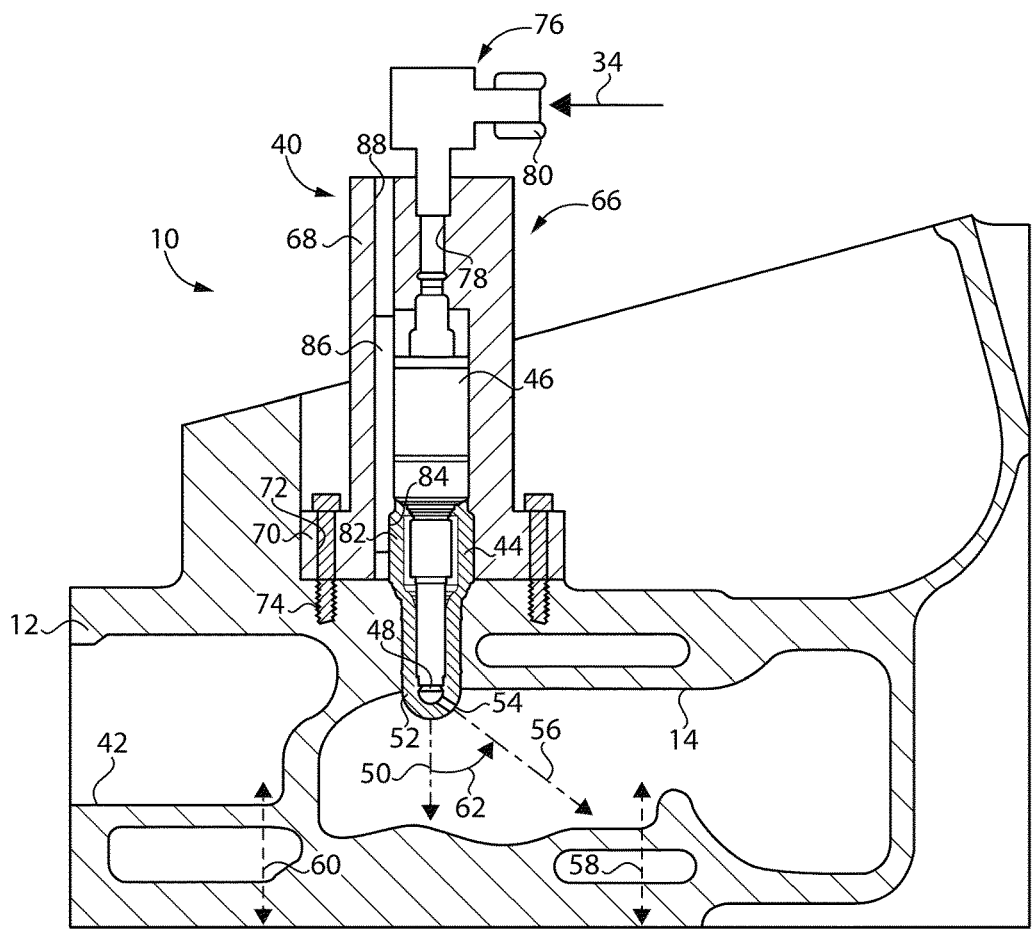
FIG. 2 is a sectioned side diagrammatic view of a portion of the engine system as in FIG. 1.
Figure 3:
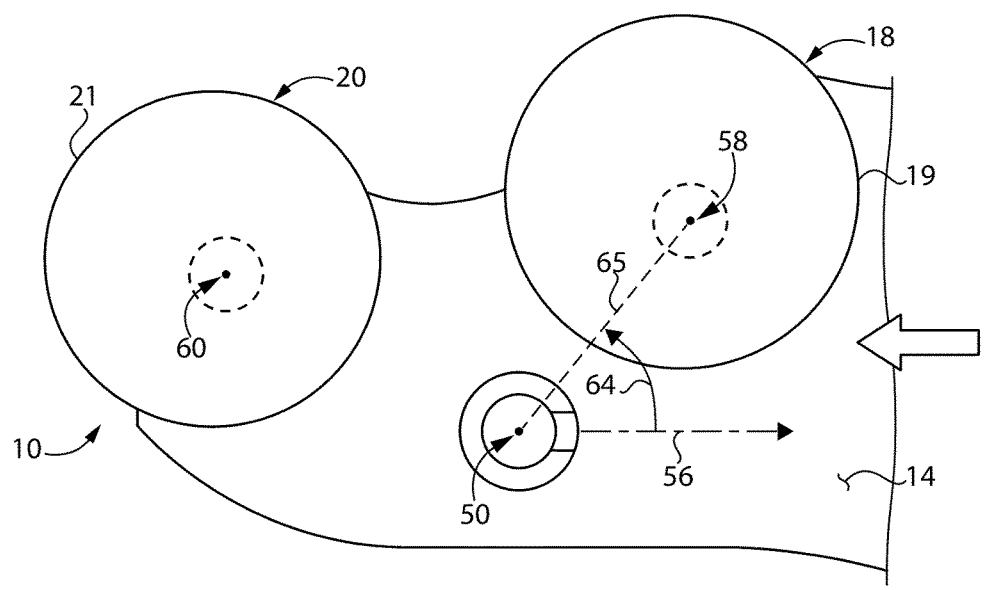
FIG. 3 is a diagrammatic view of a portion of the engine system as in FIGS. 1 and 2.

Referring also now to FIGS. 2 and 3, first intake valve opening 18 defines a first valve opening axis 58, and second intake valve opening 20 defines a second valve opening axis 60. A first intake valve 19 is shown generally and diagrammatically within first intake valve opening 18, and a second intake valve 21 is shown generally and diagrammatically within second intake valve opening 20. Port fuel injector assembly 40 includes a sleeve 44 supported in engine housing 12, and a fuel injector 46 within sleeve 44 and including a fuel injection valve 48 movable between a closed position, and an open position to inject a fuel into intake port 44. Sleeve 44 defines a sleeve axis 50, and includes a fuel-directing cap 52 extending into intake port 44 and forming a fuel injection opening 54 defining an outgoing fuel path axis 56 extending in opposition to an incoming flow of intake air. Fuel-directing cap 52 is thus part of sleeve 44, and may be formed integrally therewith. In an implementation, a linear distance from upstream intake air feed opening 16 to sleeve axis 50 is greater than a linear distance from upstream intake air feed opening 16 to first valve opening axis 58.

From FIG. 1, it can be readily visualized that a sleeve axis defined by the sleeve in each port fuel injector assembly 50 is relatively further away from intake valve feed opening 16 than a valve opening axis defined by each respective first intake valve opening 18. Put differently, with respect to apparatus associated with each intake port 14, a first intake valve opening is relatively more upstream, a second intake valve opening is relatively more downstream, and a port fuel injector assembly and sleeve thereof is between the respective first intake valve opening and second intake valve opening in an upstream-to-downstream direction.

Also in a practical implementation, outgoing fuel path axis 56 may define a fuel exit angle 62 with sleeve axis 50 that is from 50° to 90°. In a refinement, the fuel exit angle 62 may be 80°±5°. As can also be seen from FIG. 3, a clocking angle 64 less than 90°, and typically between 30° and 60°, is defined in a projection plane between outgoing fuel path axis 56 and a line 65 defined between sleeve axis 50 and first valve opening axis 58. It can thus be appreciated from the illustrations of FIGS. 2 and 3 that a path of outgoing fuel from port fuel injector assembly 40 is directed generally upstream and downward, and also close to, or potentially directly at, first intake valve opening 18. This configuration takes advantage of the incoming flow of intake air which urges a flow of the port-injected gaseous fuel into first intake valve opening 18. Some of the port injected gaseous fuel is also carried further downstream into second intake valve opening 20, generally resulting in an approximately even distribution of port-injected gaseous fuel to the respective first and second intake valve openings 18 and 20.

Figures 4, 5:
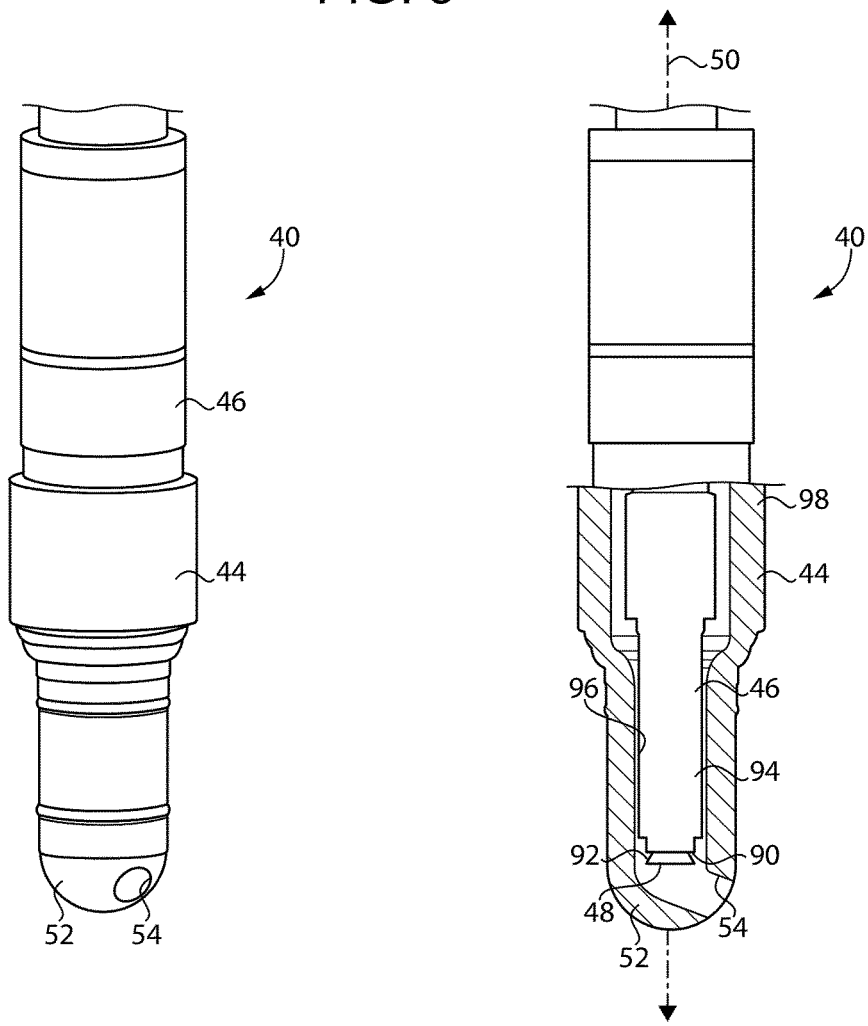
FIG. 4 is a diagrammatic view of a port fuel injector assembly, according to one embodiment.
FIG. 5 is a partially sectioned side diagrammatic view of a port fuel injector assembly as in FIG. 4.

Focusing on FIG. 2, but also referring now to FIGS. 4 and 5, port fuel injector assembly 40 may also include an injector mount assembly 66. Injector mount assembly 66 may be positioned externally of engine housing 12 and includes a mount 68 having a base 70 abutting engine housing 12, and a plurality of bolts 74 extending through base 70 and into bolt holes 72 formed in engine housing 12. Port fuel injector assembly 40 may also include a connector assembly 76, and forms a fluid passage 78 extending between a fitting 80 connected to fuel feed conduit 34 and port fuel injector 46.

As can best be seen from FIG. 5, port fuel injector 46 may include injection valve 48, and injection valve 48 may be outwardly opening. Fuel injection valve 48 may be movable along sleeve axis 50 between a closed position where a conical seating surface 92 contacts a valve seat 90, and an open position to inject a fuel from fuel injection opening 54. Outwardly opening means opening in a direction of intake port 14. Valve seat 90 may be defined by an injector housing 94. Sleeve 44 may include a total of one fuel injection opening 54 as illustrated. Fuel-directing cap 52 may have a dome shape, and fuel injection opening 54 may have a cylindrical shape extending through the dome shape. Opposite to fuel-directing cap 52 is a head portion 98 of sleeve 44 that may be positioned externally to engine housing 12 in some embodiments. Sleeve 44 also includes an axially extending sleeve cavity 96 that varies in internal diameter dimension and receives port fuel injector 46.

Returning focus back to FIG. 2, in an embodiment sleeve 44 may include an external locating surface 82. Port fuel injector assembly 40 may include a second locating surface 84 in contact with external locating surface 82 and fixing sleeve 44 at the desired clocking angle 64 in engine housing 12. As illustrated, second locating surface 84 may be formed by a removable insert 86 of injector mount assembly 66, such as an elongate pin, a rod, a fastener, or the like, inserted along an insertion direction generally parallel to sleeve axis 50 in at least some embodiments. In one practical implementation, sleeve 44 may be configured for installation in only one installation orientation in engine housing 12 around sleeve axis 50 based on interaction between external locating surface 82 and second locating surface 84 in cooperation with positioning of bolts 74. Removable insert 86 may be slid into bore 88 in injector mount 68 to position sleeve 44, and thus to position fuel injection opening 54, as desired for service. External locating surface 82 and second locating surface 84 may include flat surfaces, or one flat surface and a hemispheric surface, or other variations or combinations of these. Still other embodiments might configure sleeve 44 to have an outer shape that mates with injector mount 68, engine housing 12, or other structures in only a single installation orientation.

INDUSTRIAL APPLICABILITY

Referring to the drawings generally, when engine system 10 is operated, turbocharger 22 rotates to pressurize a feed of intake air supplied into intake valve opening 16, and distributed to each of the plurality of intake ports 14. Fuel pump 32 can be operated to pressurize a gaseous fuel, such as a gaseous hydrogen fuel, to be fed to each port fuel injector assembly 40. Each fuel injection valve 48 can be electrically actuated, so as to open outwardly at a desired timing to inject gaseous fuel admitted via the opening of fuel injection valve 48 through fuel injection opening 54 in each sleeve 44 at an appropriate timing. The injected gaseous fuel can be advanced from fuel injection opening 54 in opposition to a flow of a stream of incoming intake air. Based upon the exit angle, clocking angle, location of port fuel injector assembly 40 relative to the respective intake valves and intake air opening, injection pressure, and other factors discussed herein the injected gaseous fuel can be relatively evenly distributed to first intake valve opening 18 and second intake valve opening 20 for combustion in the corresponding combustion cylinder 36 in engine housing 12.

The present disclosure can be implemented as original equipment (OEM) in newly built engines and/or fuel systems. In other instances, a fuel system, an assembly of a fuel system and engine housing, or individual port fuel injector assemblies or components thereof such as sleeves might be available as parts or in retrofit applications.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine system comprising:
an engine housing including an intake port structured to convey an incoming flow of intake air from an upstream intake air feed opening to a first intake valve opening and a second intake valve opening located downstream of the first intake valve opening;
a port fuel injector assembly including a sleeve supported in the engine housing, and a fuel injector within the sleeve and including a fuel injection valve movable between a closed position, and an open position to inject a fuel into the intake port; and
the sleeve defining a sleeve axis and including a fuel-directing cap extending into the intake port and forming a fuel injection opening defining an outgoing fuel path axis extending in opposition to the incoming flow of intake air.

2. The engine system of claim 1 wherein:
the first intake valve opening defines a first valve opening axis and the second intake valve opening defines a second valve opening axis; and
a linear distance from the upstream intake air feed opening to the sleeve axis is greater than a linear distance from the upstream intake air feed opening to the first valve opening axis.

3. The engine system of claim 2 wherein the outgoing fuel path axis defines a fuel exit angle with the sleeve axis from 50° to 90°.

4. The engine system of claim 3 wherein the fuel exit angle is 80° plus or minus 5°.

5. The engine system of claim 2 wherein a clocking angle less than 90° is defined, in a projection plane, between the outgoing fuel path axis and a line defined between the sleeve axis and the first valve opening axis.

6. The engine system of claim 5 wherein the sleeve includes an external locating surface, and the port fuel injector assembly includes a second locating surface in contact with the external locating surface and fixing the sleeve at the clocking angle.

7. The engine of claim 6 wherein the port fuel injector assembly includes an injector mount assembly positioned externally of the engine housing, and the second locating surface is formed by a removable insert of the injector mount assembly.

8. The engine system of claim 1 wherein the fuel injection valve includes an outwardly opening fuel injection valve, and further comprising a gaseous fuel supply, and a gaseous fuel supply conduit fluidly connecting the gaseous fuel supply to the port fuel injector assembly.

9. A fuel injector assembly comprising:
a sleeve defining a sleeve axis and including a fuel-directing cap forming a fuel injection opening defining an outgoing fuel path axis oriented at a fuel exit angle relative to the sleeve axis; and
a fuel injector within the sleeve and including an outwardly opening fuel injection valve movable along the sleeve axis between a closed position, and an open position to inject a fuel from the fuel injection opening.

10. The fuel injector assembly of claim 9 wherein the sleeve includes a total of one fuel injection opening.

11. The fuel injector assembly of claim 9 wherein the fuel-directing cap includes a dome shape, and the sleeve further includes an axially extending central cavity and the fuel injection opening includes a cylindrical fuel injection opening extending from the central cavity through the dome shape of the fuel-directing cap.

12. The fuel injector assembly of claim 11 wherein the fuel injector includes a conical valve seat, and the fuel injection valve includes a conical valve seating surface in contact with the conical valve seat at the closed position.

13. The fuel injector assembly of claim 9 wherein the sleeve includes an external locating surface, and the fuel injector assembly further includes a second locating surface in contact with the external locating surface and fixing an orientation of the sleeve about the sleeve axis.

14. The fuel injector assembly of claim 13 further comprising an injector mount assembly including the second locating surface.

15. The fuel injector assembly of claim 14 wherein the injector mount assembly includes an injector mount, and a removable insert that includes the second locating surface.

16. The fuel injector assembly of claim 9 wherein a fuel exit angle defined between the fuel path axis and the sleeve axis is from 50° to 90°.

17. The fuel injector assembly of claim 16 wherein the fuel exit angle is 80° plus or minus 5°.

18. A method of operating an engine system comprising:
opening a fuel injection valve of a port fuel injector supported in a sleeve in an engine housing;
injecting a gaseous fuel admitted via the opening of the fuel injection valve through a fuel injection opening in the sleeve into an intake port in the engine housing;
advancing the injected gaseous fuel from the fuel injection opening in opposition to a flow of a stream of incoming intake air; and
distributing the injected gaseous fuel to a first intake valve opening and a second intake valve opening for combustion in a cylinder in the engine housing.

19. The method of claim 18 wherein the opening a fuel injection valve includes opening the fuel injection valve outwardly, and the injecting a gaseous fuel includes injecting the gaseous fuel at a fuel exit angle that is between 50° and 90° relative to a sleeve axis of the sleeve.

20. The method of claim 18 wherein the gaseous fuel includes gaseous molecular hydrogen.

* * * * *